United States Patent [19]
Tokutu

[11] Patent Number: 5,383,561
[45] Date of Patent: Jan. 24, 1995

[54] WEIGHT CHECKER-SORTER

[75] Inventor: Harunori Tokutu, Shiga, Japan

[73] Assignee: Ishida Co., Ltd., Kyoto, Japan

[21] Appl. No.: 155,055

[22] Filed: Nov. 19, 1993

[30] Foreign Application Priority Data

Dec. 29, 1992 [JP] Japan .................. 4-359933

[51] Int. Cl.⁶ ........................................... B07C 5/16
[52] U.S. Cl. .................................. 209/645; 177/50
[58] Field of Search .............. 209/645, 646; 177/50

[56] References Cited
U.S. PATENT DOCUMENTS

5,109,936  5/1992  Ruppel .................. 177/50

FOREIGN PATENT DOCUMENTS

31101    6/1985  Japan .
4081625  3/1992  Japan .................. 209/645

Primary Examiner—Kenneth W. Noland
Attorney, Agent, or Firm—Heller, Ehrman, White & McAuliffe

[57] ABSTRACT

A weight checker-sorter successively weighs products each expected to contain a specified number of articles all weighing about the same, and uses a standard weight value to determine whether weighed products each contains the intended number of articles. Measured weights of products within a predefined range are stored. The standard weight value is updated frequently by averaging a specified plural number of most recently stored weights.

20 Claims, 6 Drawing Sheets

WEIGHT CHECKER-SORTER

BACKGROUND OF THE INVENTION

This invention relates to a weight checker-sorter, which is an apparatus for weighing products intended to contain a specified number of articles to thereby determine whether each weighed product contains more or less than the specified number of the articles and to sort the weighed products accordingly.

Figure 6:
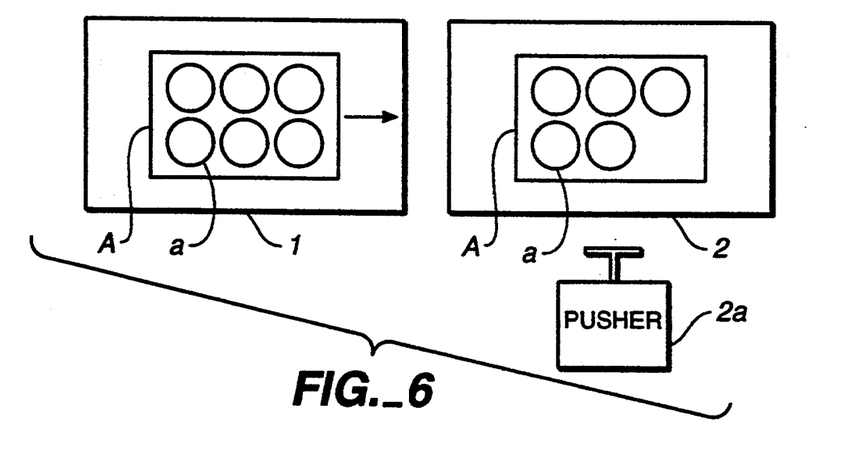
FIG. 6 is a schematic plan view of a weight checker-sorter in general.

When products to be sold are in the form of a box or a Package containing a specified number of articles, it has been known to make use of a weight checker-sorter such as described in Japanese Utility Model Publication Jikko 3-1101 to examine whether each product actually contains the specified number of the articles. As schematically shown in FIG. 6, such a weight checker-sorter may include a sorting conveyer 2 (serving as a sorter) disposed on the downstream side of a weighing conveyer 1 (serving as a weigher). A pusher 2a disposed near the sorting conveyer 2 is adapted to push each product A off the sorting conveyer 2 if it is determined not to contain a pre-selected intended number of articles a.

Figure 7:
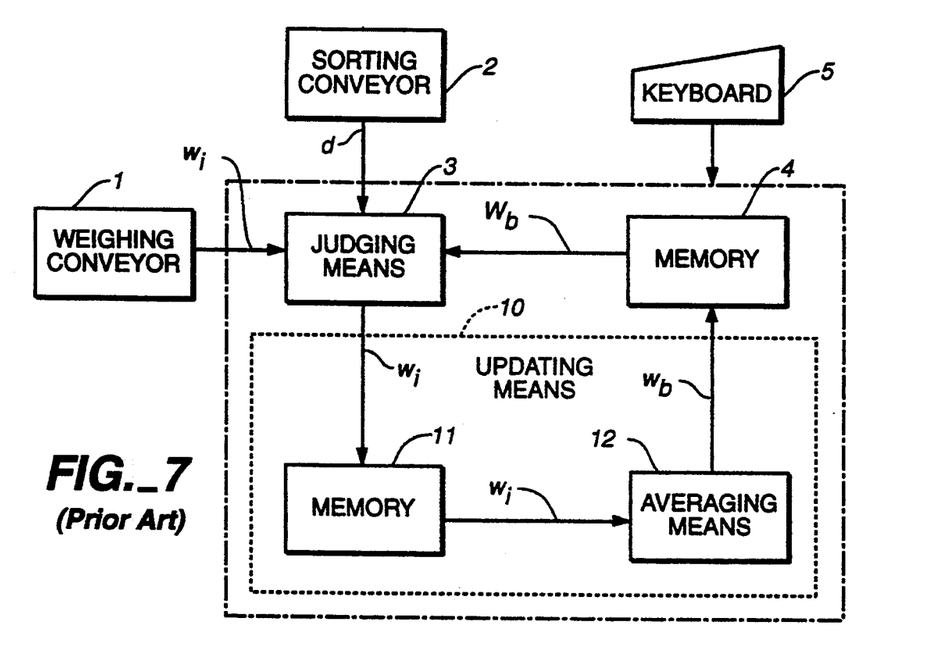
FIG. 7 is a schematic structural diagram of a prior art weight checker-sorter.

Having measured the weight of the product A, the weighing conveyer 1 outputs a weight signal $w_i$ indicative of the measured weight value $W_i$ to a judging means 3, as shown in FIG. 7. The judging means 3 compares the weight value $W_i$ with a standard value $W_b$ stored in a memory means 4. If the difference ($W_i - W_b$) is within an allowable limit, the weighed product A is considered to have "passed" the test. If the difference is not within the allowable limit, it is concluded that the number of the articles contained in the product A is either too large or too small, and a defect signal d is outputted from the judging means 3 to the sorting conveyer 2.

The standard value $W_b$ is initially inputted from a keyboard 5 but is thereafter updated by an updating means 10, which includes a memory means 11 and an averaging means 12. The memory means 11 serves to successively store measured weight values $W_i$ of products A which have been considered by the judging means 3 as having "passed" and the averaging means 12 serves to calculate a simple average of a plural number n of weight values W1, W2, ..., Wn and to obtain therefrom an average value $W_a$. Thereupon, the updating means 10 outputs a standard value signal $w_b$ to cause the average value $W_a$ to be stored in the memory means 4 as the new standard value $W_b$, thereby updating the standard weight value.

The weight of the articles a shown in FIG. 6 changes gradually during their production process due to variations in the ambient temperature and production errors. As a result, there are fluctuations in the measured weight $W_i$ of the products A. The prior art technology described above teaches how to adjust to such fluctuations by introducing a new standard weight value through an averaging process on earlier obtained weight values $W_i$.

Figure 3A:
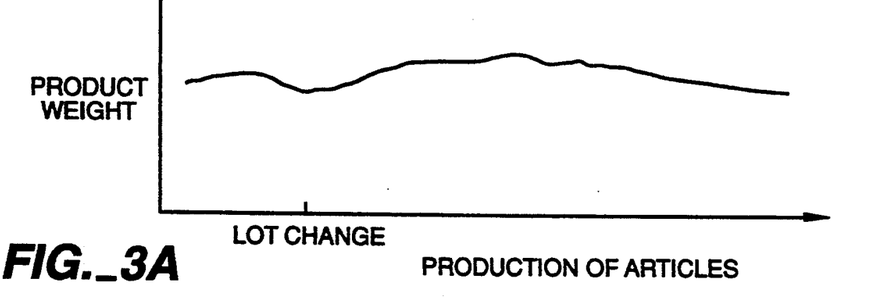
Figure 3B:
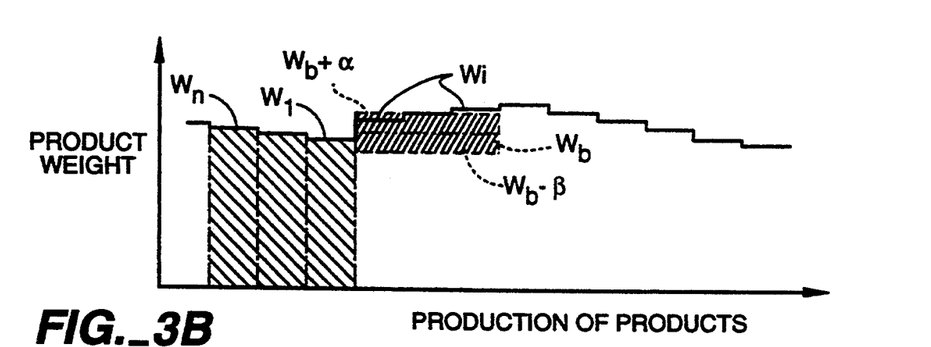
Figure 8A:
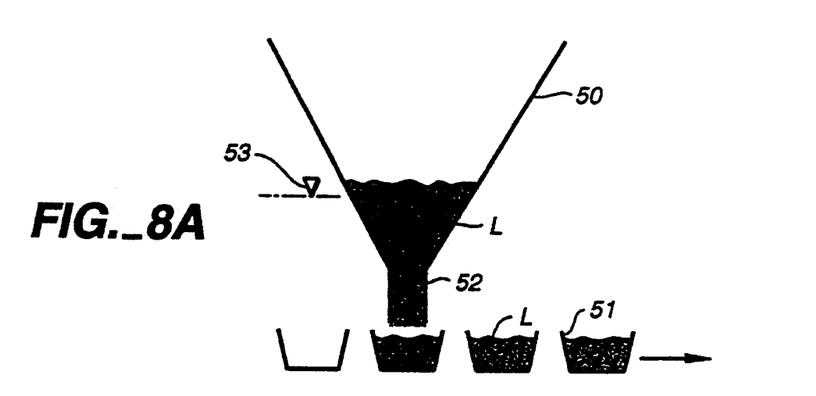
Figure 8B:
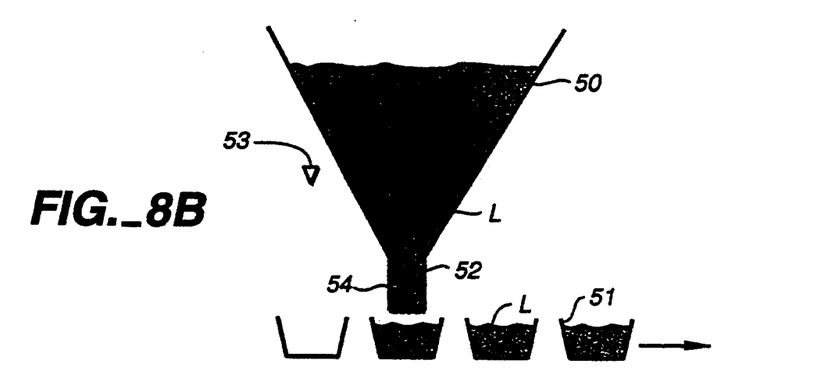

The weight $W_i$ of the products A, however, does not always change gradually. When articles from a new lot have been introduced or when the production process has been interrupted, for example, the weight $W_i$ of the product A may change suddenly. Consider the process shown in FIG. 8(a), for example, of filling containers 51 with a semi-liquid L from a hopper 50. The hopper 50 may be provided with a screw conveyer 52 for delivering a fixed amount of the semi-liquid L into the container 51 placed below. The hopper 50 may be provided also with a level sensor 53 such that, as soon as the top level of the semi-liquid L in the hopper 50 drops below its level, semi-liquid L from the next lot is dropped inside the hopper 50 as shown in FIG. 8(b). This causes an increase in the pressure near the bottom outlet 54, and the amount of the semi-liquid L delivered into the container 51 increases suddenly, as shown also in FIG. 8(b). As a result, both the article weight and the product weight not only change gradually but also increase suddenly, as shown by solid lines in FIGS. 3(a) and 3(b).

In such a situation, the measured product weight $W_i$ may become greater than the allowable upper limit (which is the sum of the standard $W_b$ and the weight a of a single article, or $W_b + a$) although the product may in fact be containing the specified number of the articles. In other words, the prior art technology cannot adjust quickly enough to a situation where there is a sudden change in the article weight.

SUMMARY OF THE INVENTION

In view of the above, it is an object of the present invention to provide a weight checker-sorter of the type for judging whether a given product contains an intended number of articles or not from the measured weight of the product, capable of adjusting itself quickly when there is a sudden change in the article weight such that sorting can be effected with improved accuracy.

A weight checker-sorter embodying the present invention, with which the above and other objects can be accomplished, may be characterized as comprising means for calculating an average of a certain plural number (=n) of weight values which have most recently been measured and determined to be within a required range and hence "acceptable". Such average values are calculated once every n' times such that an acceptable weight is measured where n' is an integer smaller than n.

Figure 3C:
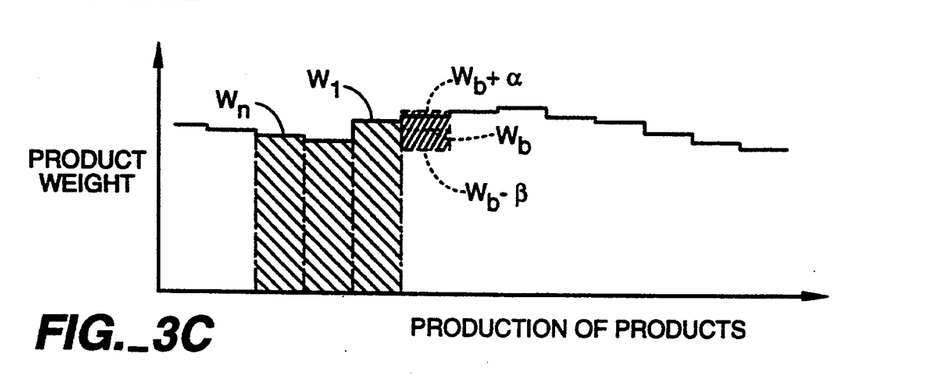
Figure 3D:
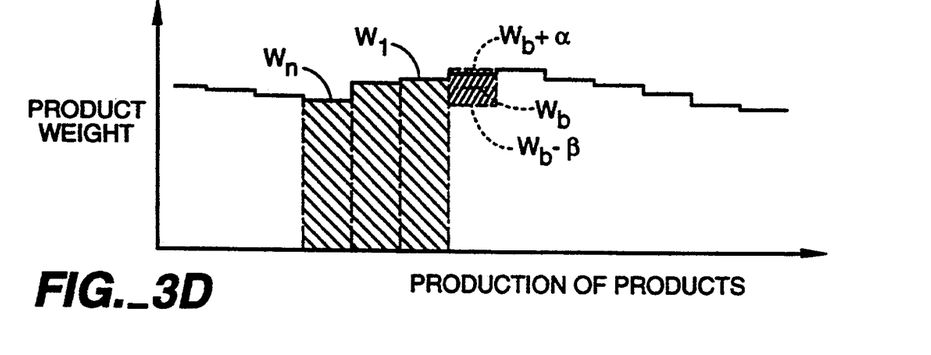

The principle of this invention will be explained next with reference to FIGS. 3(c) and 3(d). Let us assume that products, all expected to contain a specified plural number of articles of approximately the same weight, are successively being weighed. Measured weights which are within a certain range and hence considered acceptable are successively stored such that n of those weight values which were most recently stored are always available. At any moment, let $W_1$ denote the weight value which was most recently stored as being acceptable, and let generally $W_j$ (j being a dummy index 2, ... n) denote the weight valued stored jth most recently. Every time a measured weight value is found to be acceptable and stored as $W_1$, an average $W_a$ of the n most recently stored weight values, inclusive of $W_1$ which has just been measured and stored, is calculated by a predetermined averaging formula or algorithm and is used as the new standard weight. When the next product is weighed, its weight value is compared with this updated standard weight and determined whether it is acceptable or not. In other words, the standard weight value is updated as soon as a product is weighed and determined to be acceptable. Thus, as shown in FIGS. 3(c) and 3(d), the standard weight $W_b$ changes quickly as the weight of individual articles, and hence also the weight of a product suddenly increases.

BRIEF DESCRIPTION OF THE DRAWINGS

The accompanying drawings, which are incorporated in and form a part of this specification, illustrate an embodiment invention and, together with the description, serve to explain the principles of the invention. In the drawings:

FIG. 3($a$) is a graph for showing an example of the way article weight may change as the articles are produced, FIG. 3($b$) is a graph for showing the way product weight may change corresponding to the change in article weight shown in FIG. 3($a$) if a prior art checker-sorter is used, and FIGS. 3($c$) and 3($d$) are graphs which show the change in product weight if use is made of a weight checker-sorter according to a first embodiment of the invention;

FIGS. 8($a$) and 8($b$) are schematic drawings for showing an example of machine for producing articles.

In these figures, components which are the same, or at least substantially similar, are indicated by the same numerals such as the weighing conveyer 1.

DETAILED DESCRIPTION OF THE INVENTION

Figure 1:
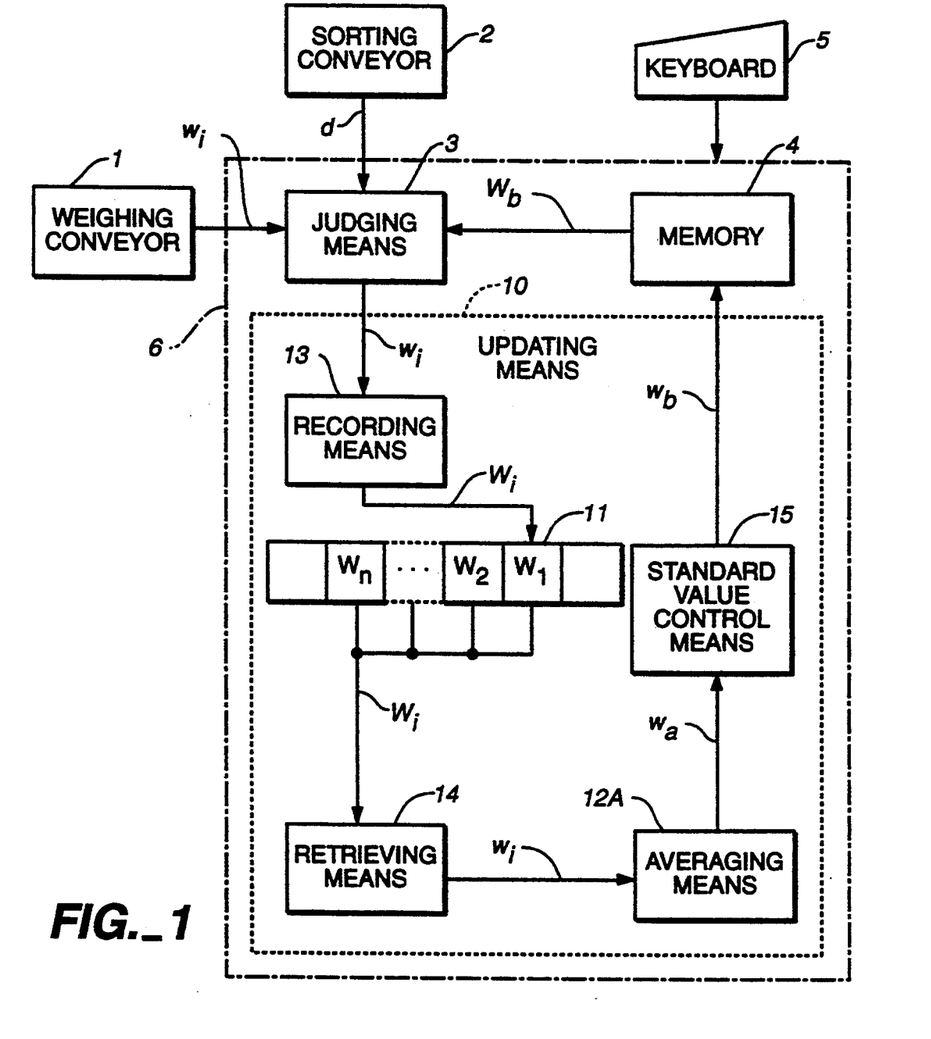
FIG. 1 is a schematic structural diagram of a weight checker-sorter according to a first embodiment of the invention.

The invention will be described next by way of examples. In FIG. 1, which shows a weight checker-sorter according to a first embodiment of the invention, numeral 10 indicates a standard value updating means contained within a microcomputer 6 comprising a memory means 11 for storing at least a predetermined plural number (=n) of weight values which have been measured, an averaging means 12A for carrying out an averaging process, a recording means 13, a retrieving means 14 and a standard value controlling means 15, to be explained below. This weight checker-sorter is different from the prior art weight checker-sorter shown in FIG. 7 only in the standard value updating means 10. So, FIG. 1 will be explained next mainly regarding the standard value updating means 10.

When the recording means 13 of FIG. 1 receives from the judging means 3 a weight signal $w_i$ corresponding to the weight value $W_i$ of a product which is "passed" by the judging means 3, this weight value $W_i$ is stored at the area in the memory means 11 where the oldest of the weight values currently in the memory means 11 is stored. Whenever a new weight value $W_i$ is thus stored by the recording means 13 in the memory means 11, the retrieving means 14 retrieves from the memory means 11 the predetermined plural number n of weight values $W_p$ (p=1, ... n) which were stored most recently (inclusive of the value which has just been stored to initiate this retrieving operation) and to output weight signals $w_p$ (p=1, ... n) indicative of these n weight values $W_p$ (p=1, ... n) to the averaging means 12A. Throughout herein, $W_1$ denotes the weight value most recently stored in the memory means 11, $W_2$ denotes the second most recently stored weight value, and so on at any given time.

Having thus received the n weight signals $w_p$, the averaging means 12A calculates an average value $W_a$ from the n most recently stored weight values. The average value $W_a$ may be obtained by the following simple averaging formula:

$$W_a = (W_n + \ldots + W_2 + W_1)/n. \tag{1}$$

Alternatively, $W_a$ may be a weighed average and some of the weight coefficients may even be zero. In other words, expressions like "average" and "averaging" should be very broadly interpreted within the context of this invention.

The average value $W_a$ calculated by the averaging means 12A is outputted to the standard value controlling means 15 by an average value signal $w_a$. The standard value controlling means 15 checks whether the average value $W_a$ is between a lower limit value $Wb_{min}$ and an upper limit value $Wb_{max}$ and to output one of these three values ($W_a$, $Wb_{min}$ and $Wb_{max}$) to a memory means 4 by a standard value signal $wb$, as will be explained more in detail below, thereby replacing the currently stored standard value $W_b$.

Figure 2:
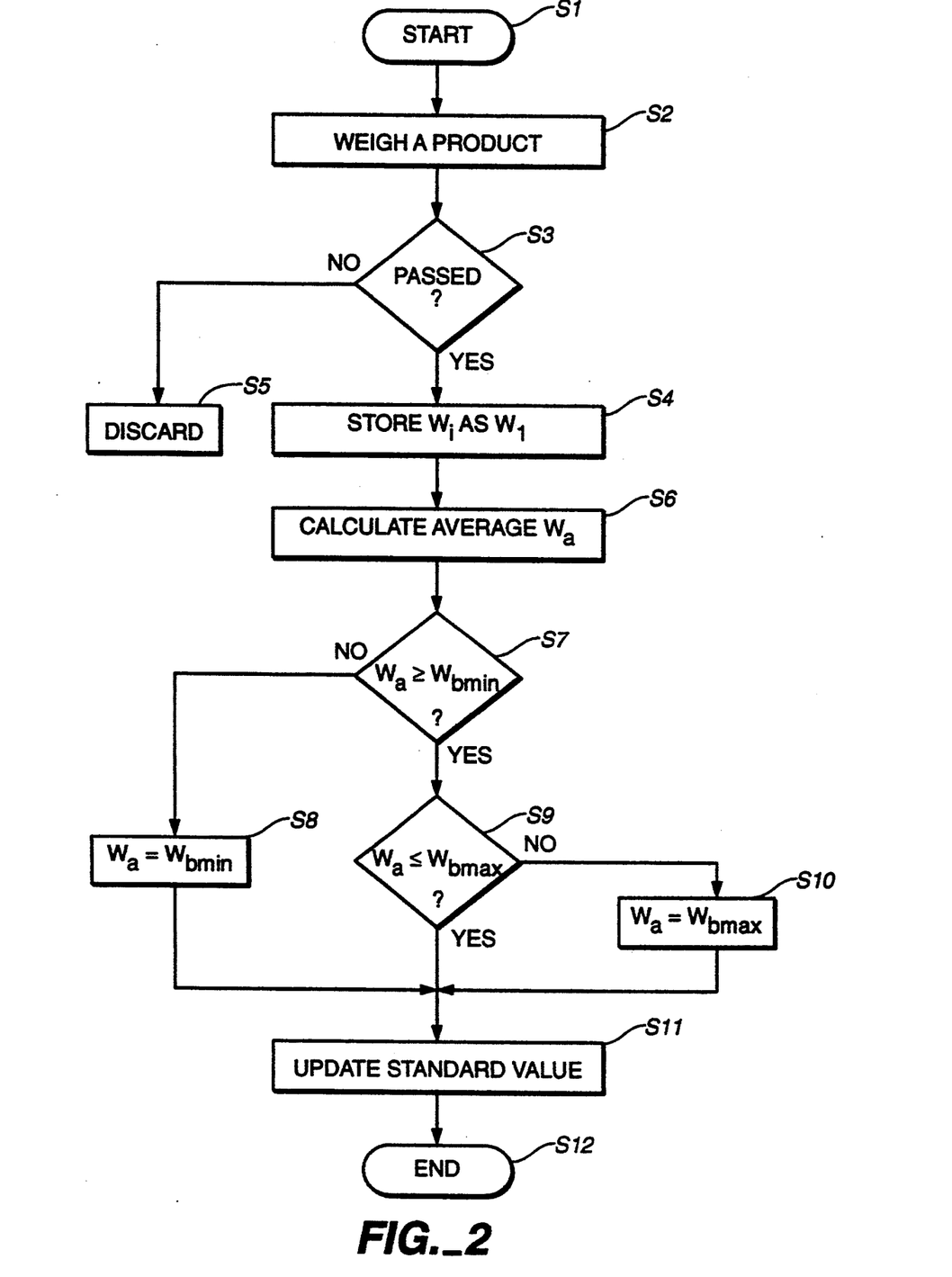
FIG. 2 is a flow chart for the operation of the weight checker-sorter of FIG. 1.

A control program for carrying out the process described above will be explained more in detail below with reference to the flow chart shown in FIG. 2. After the program is started (Step S1), a product on the weighing conveyer 1 is weighed (Step 2), and a weight signal $w_i$ indicative of its measured weight value $W_i$ is outputted to the judging means 3. The judging means 3 then determines whether this weight value $W_i$ is within a predefined range between ($W_b - \beta$) and ($W_b + \alpha$), that is, whether it "passes" or not as an acceptable product (Step S3). If it does not pass, it is sorted out and immediately discharged (Step S5). If it passes, the recording means 13 causes this weight value $W_i$ to be stored in the memory means 11 as the most recently measured value $W_1$, replacing the oldest of the memory values then stored in the memory means 11 (Step S4).

Next, the n most recently stored weight values $W_n$, ... $W_2$, $W_1$ (that is, inclusive of the weight value which has just been stored as $W_1$ in Step S4) are retrieved and an average value $W_a$ is calculated therefrom by a predefined averaging formula or algorithm (Step S6). If $W_a$ is determined to be smaller than a predefined lower limit value $Wb_{min}$ (NO in Step S7) or greater than a predefined upper limit value $Wb_{max}$ (YES in Step S7 or NO in Step S9), $W_a$ is replaced respectively by $Wb_{min}$ (Step S8) or $Wb_{max}$ (Step S10) before $W_a$ is stored as the new standard weight value, replacing the old standard value $W_b$ thereby (Step S11), and ending the program (Step S12). In summary, since the standard weight value $W_b$ is updated every time a newly measured weight value is "passed" as shown in FIGS. 3($c$) and 3($d$), the weight checker-sorter thus controlled can quickly adjust itself to a sudden large change in the measured weight and hence the sorting can be effected with improved accuracy.

It is not necessary according to the present invention, however, that the averaging process for obtaining a new weight value $W_a$ and the updating of the standard weight value $W_b$ be carried out each time a weighed product "passes" as acceptable. It is still within the scope of the invention if the aforementioned steps of obtaining a new weight value $W_a$ and replacing therewith the current standard weight value $W_b$ are carried out once every n' times where n' is an integer smaller than n. It is also to be noted, as reminded above, that the averaging does not necessarily mean calculating a simple average by Formula (1). As a special example, the "average" weight value $W_a$ of n earlier obtained weight values $W_p$ (p=1, ... n) may be obtained by eliminating the largest and the smallest of them and then taking the simple average of the remaining weight values.

Figure 4:
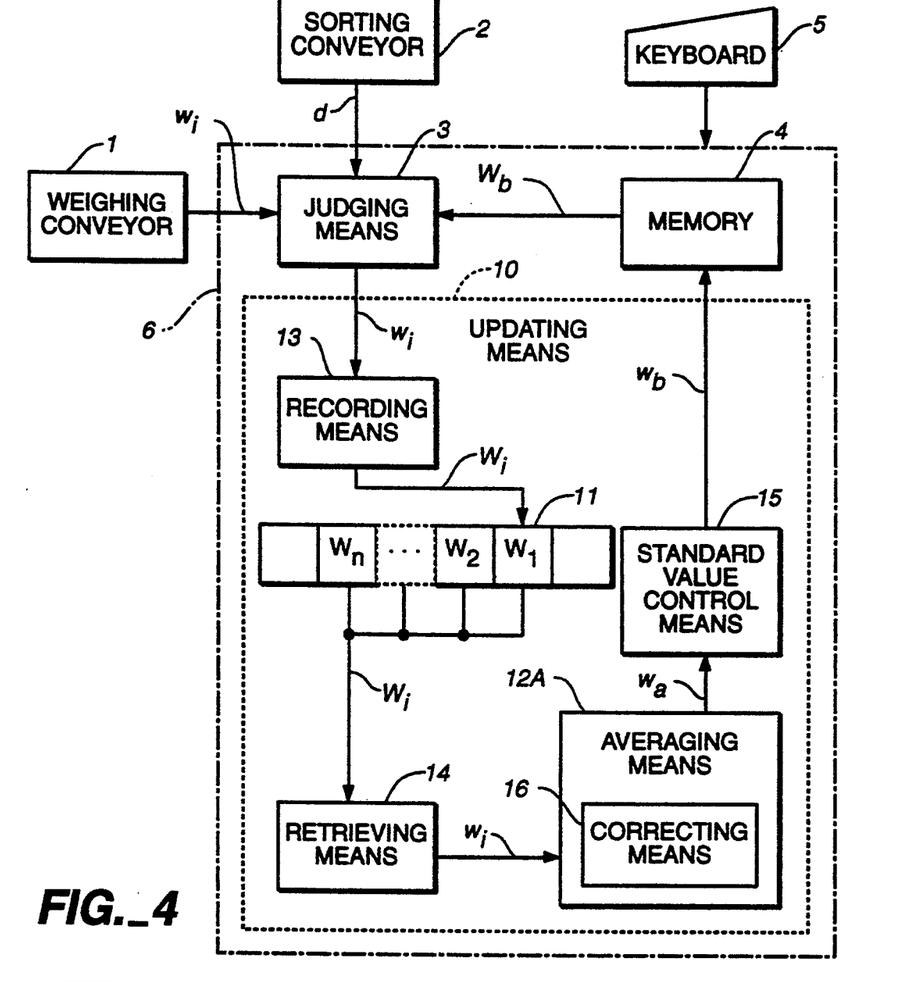
FIG. 4 is a schematic structural diagram of a weight checker-sorter according to a second embodiment of the invention.
Figure 5:
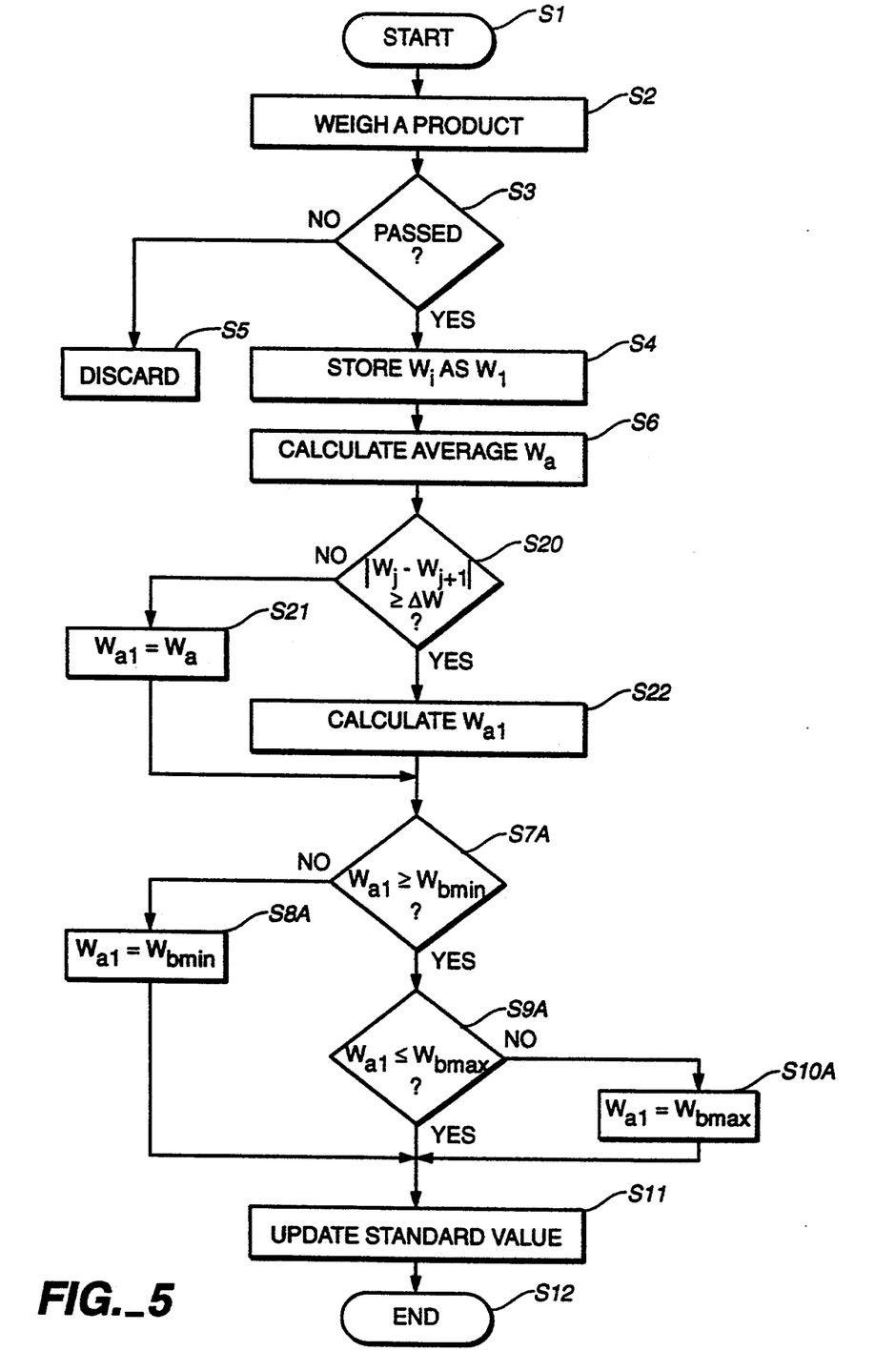
FIG. 5 is a flow chart for the operation of the weight checker-sorter of FIG. 4.

FIGS. 4 and 5 are referenced next to describe a weight checker-sorter according to another embodiment of the invention characterized in that its averaging means 12A includes a correcting means 16. When the difference between weight values $W_j$ and $W_{j+i}$, which are respectively the weight value stored in the memory means 11 jth and (j+1)st most recently, is greater than a predefined difference value $\Delta W$, this correcting means 16 corrects the value $W_a$ and obtain a corrected value $W_{a1}$ as follows:

$$W_{a1} = W_a + \Sigma C_j(W_j - W_{j+i}) \quad (2)$$

where $C_j$ are correction coefficients such that $C_j > C_{j+1}$.

The correction method described above is explained next with reference to the flow chart of FIG. 5, in which the first six steps (Steps S1–S6) are the same as in FIG. 2. After the average value $W_a$ is calculated (Step S6), the program compares the jth and (j+1)st most recently stored weight values $W_j$ and $W_{j+1}$ to determined whether their difference is greater than the predefined difference value $\Delta W$ or not (Step 20). This difference value $\Delta W$ may be set by multiplying $\alpha$ or $\beta$ by a number smaller than 1. If the difference is smaller than the difference value (NO in Step S20), the newly calculated average value $W_a$ is itself used as the corrected average value $W_{a1}$ (Step S21). If the difference is equal to or greater than $\Delta W$ (YES in Step S20), the corrected average value $W_{a1}$ is calculated by Formula (2) given above (Step S22). Steps S7A–S10A are the same as Steps S7–S10 of FIG. 2, and hence will not be explained again.

In summary, the average value $W_a$ is corrected by the measured values $W_j$ and $W_{j+1}$ obtained j and (j+1) times earlier, that is, by the recent change in the measured value ($W_j - W_{j+1}$). Thus, it is possible to respond more quickly to sudden changes in the weight of products.

Although the invention has been described above with reference to only a limited number of examples, these examples are not intended to limit the scope of the invention. Many modifications and variations are possible within the scope of the invention. For example, Formula (2) given above may be replaced by Formula (3) given below:

$$W_{a1} = W_a + A(W_1 - W_a) + B \quad (3)$$

where A and B are constants, and the judging means 3 will compare the absolute value of ($W_a - W_1$) with $\Delta W$ in Step S20 of FIG. 5.

Although it was shown in each of the examples described above that the standard value control means 15 of FIG. 1 controls the upper and lower limits of the standard value $W_b$, it may equally well control the upper and lower limits of allowable upper and lower limits $W_b + \alpha$ and $W_b - \beta$. Moreover, weighing and sorting means need not comprise a weighing conveyer and a sorting conveyer, respectively.

In summary, this invention teaches the introduction of a standard value control means to a weight checker-sorter and hence the standard value can be updated quickly when there is a sudden change in the weight of a product. As a result, sorting of products can be effected with improved accuracy.

What is claimed is:

1. A weight checker-sorter comprising:
   a weighing means for weighing a product expected to contain a specified plural number of articles;
   judging means for determining whether or not said product, weighed by said weighing means, contains said specified plural number of said articles by comparing measured weight value obtained by said weighing means and a current standard value;
   weight memory means for storing weight values of products which have been considered acceptable by said judging means;
   updating means for calculating a new standard value from a plurality of weight values stored in said weight memory means; and
   sorting means for sorting products weighed by said weighing means according to determinations by said judging means;
   said updating means including averaging means for calculating an average once every n' times as new weight values are stored in said weight memory means, said average being of n weight values most recently stored in said weight memory means at the time, n and n' being integers, and n being greater than n', said averaging means including correcting means for correcting the value of said average to take into account of effects of sudden changes in said weight values.

2. The weight checker-sorter of claim 1 wherein said average is a simple average of said n weight values.

3. The weight checker-sorter of claim 1 wherein said average is a weighed average of said n weight values.

4. The weight checker-sorter of claim 1 wherein said updating means checks whether or not said average is greater than a predefined lower limit value and whether or not said average is smaller than a predefined upper limit value, and accordingly defines said average, said lower limit value or said upper limit value as said new standard value.

5. The weight checker-sorter of claim 4 wherein said updating means defines said average as said new standard value if said average is larger than said lower limit value but smaller than said upper limit value, said updating means defines said lower limit value as said new standard value said average is smaller than said lower limit value, and said updating means defines said upper limit value as said new standard value if said average is larger than said upper limit value.

6. The weight checker-sorter of claim 1 further comprising a standard value memory means for storing said current standard value.

7. The weight checker-sorter of claim 1 wherein said correcting means corrects said average by the formula:

$$W_{a1} = W_a + \Sigma C_j(W_j - W_{j+1})$$

where $W_a$ and $W_{a1}$ are the values of said average before and after correction, respectively; $W_j$ is the jth most recently stored of said n weight values, j being a dummy index between 1 and (n-1); $\Sigma$ being a summation over such values of j for which the absolute value of $(W_j - W_{j+1})$ is greater than a predefined difference value; and $C_j$ are predefined coefficients such that $C_j > C_{j+1}$.

8. A weight checker-sorter comprising:
a weighing means for weighing a product expected to contain a specified plural number of articles;
input means for setting a current standard value;
judging means for determining whether or not said product, weighed by said weighing means, contains said specified plural number of said articles by comparing measured weight value obtained by said weighing means and said current standard value;
weight memory means for storing weight values of products which have been considered acceptable by said judging means;
updating means for calculating a new standard value from a plurality of weight values stored in said weight memory means; and
sorting means for sorting products weighed by said weighing means according to determinations by said judging means;
said updating means including averaging means for calculating an average once every n' times as new weight values are stored in said weight memory means, said average being of n weight values most recently stored in said weight memory means at the time, n and n' being integers, and n being greater than n', said averaging means including correcting means for correcting the value of said average to take into account of effects of sudden changes in said weight values.

9. The weight checker-sorter of claim 8 wherein said average is a simple average of said n weight values.

10. The weight checker-sorter of claim 8 wherein said average is a weighed average of said n weight values.

11. The weight checker-sorter of claim 8 wherein said updating means checks whether or not said average is greater than a predefined lower limit value and whether or not said average is smaller than a predefined upper limit value, and accordingly defines said average, said lower limit value or said upper limit value as said new standard value, whereby said new standard value may or may not be equal to said current standard value.

12. The weight checker-sorter of claim 11 wherein said updating means defines said average as said new standard value if said average is larger than said lower limit value but smaller than said upper limit value, said updating means defines said lower limit value as said new standard value if said average is smaller than said lower limit value, and said updating means defines said upper limit value as said new standard value if said average is larger than said upper limit value.

13. The weight checker-sorter of claim 8 further comprising a standard value memory means for storing said current standard value.

14. The weight checker-sorter of claim 8 wherein said correcting means corrects said average by the formula:

$$W_{a1} = W_a + \Sigma C_j(W_j - W_{j+1})$$

where $W_a$ and $W_{a1}$ are the values of said average before and after correction, respectively; $W_j$ is the jth most recently stored of said n weight values, j being a dummy index between 1 and (n-1); $\Sigma$ being a summation over such values of j for which the absolute value of $(W_j - W_{j+1})$ is greater than a predefined difference value; and $C_j$ are predefined coefficients such that $C_j > C_{j+1}$.

15. A weight checker-sorter comprising:
a weighing means for weighing a product expected to contain a specified plural number of articles;
judging means for determining whether or not said product, weighed by said weighing means, contains said specified plural number of said articles by comparing measured weight value obtained by said weighing means and a current standard value;
weight memory means for storing weight values of products which have been considered acceptable by said judging means;
updating means for calculating a new standard value from a plurality of weight values stored in said weight memory means; and
sorting means for sorting products weighed by said weighing means according to determinations by said judging means;
said updating means including averaging means for calculating an average once every n' times as new weight values are stored in said weight memory means, said average being of n weight values most recently stored in said weight memory means at the time, n and n' being integers, and n being greater than n'.

16. The weight checker-sorter of claim 15 wherein said average is a simple average of said n weight values.

17. The weight checker-sorter of claim 15 wherein said updating means checks whether or not said average is greater than a predefined lower limit value and whether or not said average is smaller than a predefined upper limit value, and accordingly defines said average, said lower limit value or said upper limit value as said new standard value, whereby said new standard value may or may not be equal to said current standard value.

18. The weight checker-sorter of claim 17 wherein said updating means defines said average as said new standard value if said average is larger than said lower limit value but smaller than said upper limit value, said updating means defines said lower limit value as said new standard value if said average is smaller than said lower limit value, and said updating means defines said upper limit value as said new standard value if said average is larger than said upper limit value.

19. The weight checker-sorter of claim 15 further comprising a standard value memory means for storing said current standard value.

20. The weight checker-sorter of claim 15 wherein said correcting means corrects said average by the formula:

$$W_{a1} = W_a + \Sigma C_j(W_j - W_{j+1})$$

where $W_a$ and $W_{a1}$ are the values of said average before and after correction, respectively; $W_j$ is the jth most recently stored of said n weight values, j being a dummy index between 1 and (n-1); $\Sigma$ being a summation over such values of j for which the absolute value of $(W_j - W_{j+1})$ is greater than a predefined difference value; and $C_j$ are predefined coefficients such that $C_j > C_{j+1}$.

* * * * *